United States Patent [19]

Brandenstein et al.

[11] Patent Number: 4,782,576
[45] Date of Patent: Nov. 8, 1988

[54] METHOD FOR ADJUSTMENT OF MACHINE PARTS

[75] Inventors: Manfred Brandenstein, Eussenheim; Horst M. Ernst, Eltingshausen, both of Fed. Rep. of Germany

[73] Assignee: SKF GmbH, Schweinfurt, Fed. Rep. of Germany

[21] Appl. No.: 15,221

[22] Filed: Feb. 17, 1987

[30] Foreign Application Priority Data

Feb. 20, 1986 [DE] Fed. Rep. of Germany ....... 3605355

[51] Int. Cl.$^4$ .............................................. B23P 19/00
[52] U.S. Cl. ......................................... 29/445; 29/428
[58] Field of Search ...................... 29/445, 400 D, 428

[56] References Cited
U.S. PATENT DOCUMENTS 3,455,617 7/1969 Woodling ............................ 384/584
3,867,750 2/1975 Den Bleyker ..................... 29/445 X
4,596,972 6/1986 Knight et al. ........................ 335/281

Primary Examiner—Howard N. Goldberg
Assistant Examiner—Taylor J. Ross
Attorney, Agent, or Firm—Rosen, Dainow & Jacobs

[57] ABSTRACT

For adjustment of the relative positions of two machine parts, at least one of the machine parts is provided with projections outwardly formed by stamping, the projections having contact surfaces which lie against the other machine part. The adjustment is performed by setting the projections back under the influence of a pressing force according to requirements. By this operation a relatively large contact surface can be provided. The deformation process takes place exclusively in the transition region between the projection and the rest of the machine part. The restoring forces are relatively small and relatively constant over the entire restoring range.

2 Claims, 1 Drawing Sheet

METHOD FOR ADJUSTMENT OF MACHINE PARTS

FIELD OF THE INVENTION

The invention relates to a method for adjusting the relative positions of two juxtaposed machine parts by the deformation of projections formed on at least one of the machine parts.

BACKGROUND OF THE INVENTION

A method of this type is disclosed in U.S. Pat. No. 3,455,617. For the axial mounting of a bearing in a housing, a flange with a sleeve-shaped extension is provided which is pressed against an outer ring of the bearing, which is thereafter supported in the housing. The flange is accordingly bolted to the housing. In order to compensate for manufacturing tolerances, the front face of the sleeve-shaped extension is provided with an annular projection which has an axially pointed longitudinal section. The projection is plastically deformed, i.e. coined, when pressed against the outer ring, until the flange attains its axial position by contact against the housing. After the plastic deformation of the material at the tip of the projection, the material in the remaining areas undergoes elastic restoring forces, so that after this procedure a typical axial attachment with prestress is attained. The geometric form of the projection and the use of the area of plastic deformation by compression of the material greatly limits the range of manufacturing tolerances which this method can accommodate. The material of the annular peaked projection undergoes, as is evident from the drawing of the cited reference, relatively short axial strain displacement up to the compression limit, beyond which further deformation is in practice no longer possible. Furthermore, the reaction force progressively increases because of the geometric shape of the projection so that the prestress produced thereby is directly dependent on the tolerance range being compensated for. This is unacceptable for the application of the rolling bearing. A further disadvantage is the relatively small surface area of contact between the projection and the outer ring, which for alternative applications leads to deformation of the attached machine parts. In contrast to the type of attachment disclosed in the cited reference, the known process can also be used for adjustment of the relative positions of machine parts, wherein the deformable projection determines the mutual distance between the machine parts.

BRIEF SUMMARY OF THE INVENTION

The object of the invention is to provide a method of the foregoing type by which a large adjustment range with optimization of the constancy of the deformation forces and an enlarged contact surface on each projection are obtained.

In accordance with the invention the object is attained by:
(a) the use of machine parts with projections stamped out during manufacture on at least one of the machine parts, each projection having a planar contact surface; and
(b) setting back of the projections by plastic deformation of the transition region between each projection and the rest of the machine part by mutual pressing of the machine parts, each contact surface being substantially unchanged during the assembly of the machine parts.

The manufacture of the projections according to step (a) presupposes a machine part which can be manufactured by a stamping operation. The material portion ensures that a predetermined thickness will not be exceeded in the are of the locus of stamping. The projections are each manufactured by outwardly forming a portion of the material in the thickness direction from the backside of the material. Because by this operation a material portion is displaced relative to the rest of the material, the work done in deformation being necessary only in the area of the line of contact, i.e. the transition from the projection to the rest of the machine part. Each projection can for this reason be advantageously relatively large and have a correspondingly large contact surface. The stamping operation can, for example, be performed by a stamping tool which displaces the projection up to the transition region.

The foremost advantage of the method according to the invention is realized during the assembly according to step (b). Here each projection is set back to the required height under the force of the machine parts being pressed against each other. This occurs without deformation of the projection, i.e. substantially without alteration of the already large contact surface. By setback of the projections, only the transition region between each projection and the rest of the machine part is compressed, i.e. flow-deformed to a smaller dimension. Because the material in this region is greatly stretched in step (a), the restoring forces are relatively small and above all are relatively constant over the entire restoring range. In principle, each projection can in this way be set back to its original position, i.e. until the projection is level with the rest of the machine part. In this way an extremely large adjustment range is provided.

In accordance with a variation of the method of the invention, machine parts with projections manufactured by means of embossment are used. A transition region remains between the projection and the rest of the machine part, whereby this operation can be likened to shallow drawing and is especially suitable for small material thicknesses such as sheet metal.

BRIEF DESCRIPTION OF THE DRAWINGS

The preferred embodiments of the invention will be described in detail hereinafter with reference to the drawings, wherein.

DETAILED DESCRIPTION OF THE PREFERRED EMBODIMENTS

Figure 1:
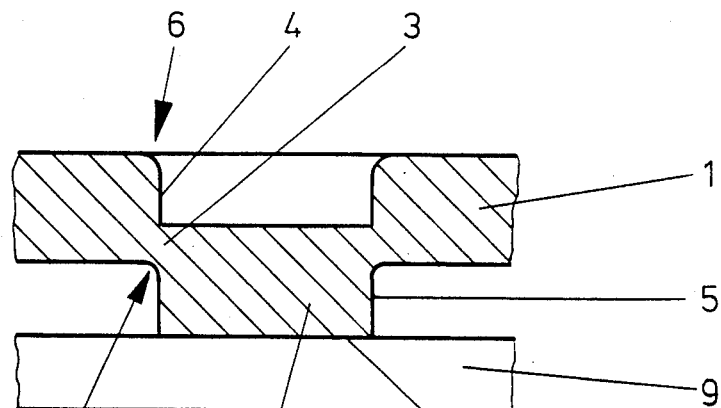
FIG. 1 is a partial sectional view of a machine part having a projection stamped outwardly by means of a stamping tool and abutting a second machine part.

In the machine part 1 shown in FIG. 1, a projection 2 has been formed by the use of a stamping tool (not shown) driven outwardly in the direction of the thickness of the material. In contrast to the conventional stamping operation, the material portion of the projection 2 is not completely separated from the remainder of the machine part 1, but rather is connected by a transition region 3 over about one-third of the total thickness of the material. The surface 4 cut by the stamping punch substantially conforms to the shape of the peripheral surface 5 of the projection 2. As a result of this operation the transition region 3 is subject to greater tensile stresses, so that a stretched structure is produced. Already at the start of stamping the rim 6 and corner zone 7 are slightly rounded through inward and outward displacement of corresponding material portions respectively. The projection 2 formed in this way has essentially the thickness of the starting material and a planar surface 8 for contacting a second machine part 9.

Figure 2:
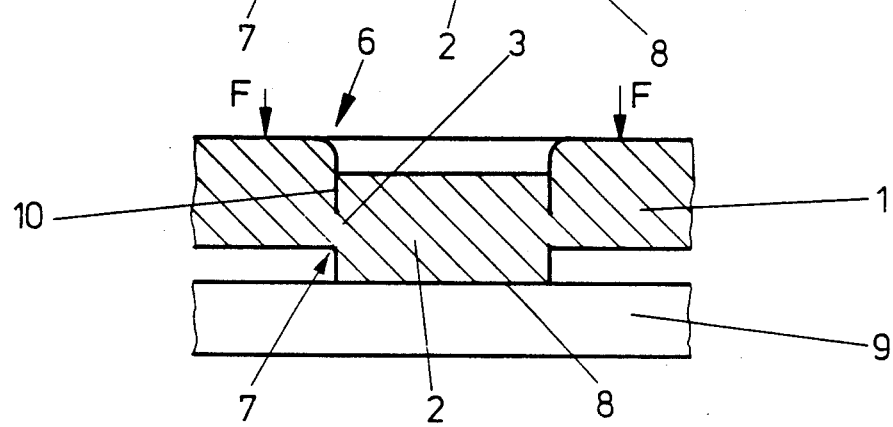
FIG. 2 is a partial sectional view after the setback of he projection shown in FIG. 1.

By adjusting the relative positions of both machine parts 1 and 9, a pressing force F can be applied to the upper surface of machine part 1 (as seen in FIG. 2) by the use of a tool (not shown). The relative distance between the machine parts is reduced by means of force F and the support of the other machine part 9, while the projection 2 is pushed back in the direction of its original position. At the same time the previously greatly stretched transition region 3 is plastically compressed, the rounding of the corner zone 7 substantially disappears, and interstice or seam 10 is formed by that material which is deformed during setback of the projection, but which is unable to join with the material of the undeformed portion of the machine part 1. The thickness of the projection 2 and especially the contact surface 8 are unchanged. The necessary deformation occurs exclusively in the transition region 3 and in the contiguous regions. In the embodiment depicted in FIG. 2, the projection 2 is pushed back about one-third of the material thickness. A complete setback is, however, possible, since a sufficient portion of flow-deformed material will remain in the still connected transition region 3.

Figure 3:
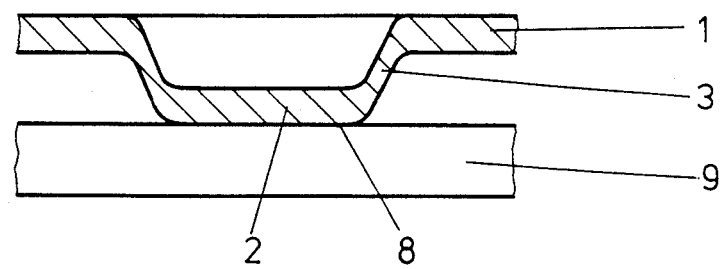
FIG. 3 is a partial sectional view of a thin-walled machine part having a projection formed as a hollow embossment by means of a tool.
Figure 4:
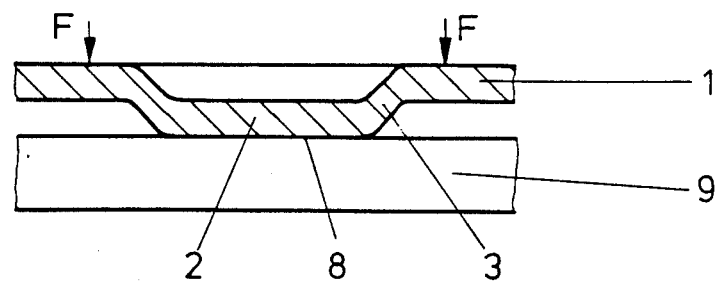
FIG. 4 is a partial sectional view after the setback of the projection shown in FIG. 3.

In accordance with the embodiment shown in FIGS. 3 and 4, a machine part 1 made of thin material, e.g. sheet metal, is used out of which the projection 2 is formed by embossment. By this operation a larger transition region 3 can be formed, partly by the drawing of material from respective sheet metal portions and partly by bending deformation. The punch of the work tool (not shown) is therefore smaller in profile than the corresponding die. For this reason the thickness of the transition region 3 relative to the original thickness, i.e. relative to the remainder of machine part 1, is also reduced. In this manner the projection 2 can, as shown in FIG. 3, be formed outwardly to a depth substantially greater than the thickness of the material.

The material of the transition region 3 is compressed by setting the projection 2 back, as shown in FIG. 4, whereby as a result of flow deformation the thickness of the material in the transition region 3 is increased. Also in accordance with this embodiment, the relative large contact surface 8 is unchanged and it is possible to set the projection 2 back to its original position with suitable pressing force.

For all embodiments the size of the projection 2 has not been described, since the dimensions can be selected within wide limits to satisfy the respective requirements, and independently therefrom the deformation operation can be confined only to the transition region 3.

The foregoing description of the preferred embodiments is presented for illustrative purposes only and is not intended to limit the scope of the invention as defined in the appended claims. Modifications may be readily effected by one having ordinary skill in the art without departing from the spirit and scope of the invention concept herein disclosed.

What is claimed is:

1. In the method for adjusting the relative positions of first and second juxtaposed machine parts by deformation of at least one projection formed on at least one of said machine parts, the improvement comprising:
    (a) forming said projection by stamping out said projection on said first machine part, the projection having a planar contact surface and remaining connected to said first machine part via a transition region, whereby said step of stamping out subjects said transition region to increased tensile stresses; and then
    (b) adjusting the position of said planar contact surface by setting back the projection with plastic deformation of the transition region between the projection and the rest of said first machine part, said step of setting back comprising the mutual pressing of said second machine part and said contact surface, whereby the contact surface is substantially unchanged in area by the setting back of the projection.

2. The method as defined in claim 1, wherein said step of stamping comprises forming said projection by embossing.

* * * * *